INVENTOR.
FRANK W. COOPER
By his attorney

INVENTOR.
FRANK W. COOPER
By his attorney

Jan. 19, 1971   F. W. COOPER   3,555,618
PLASTIC MOLDING APPARATUS
Original Filed Dec. 3, 1965   5 Sheets-Sheet 4

INVENTOR.
FRANK W COOPER
By his attorney

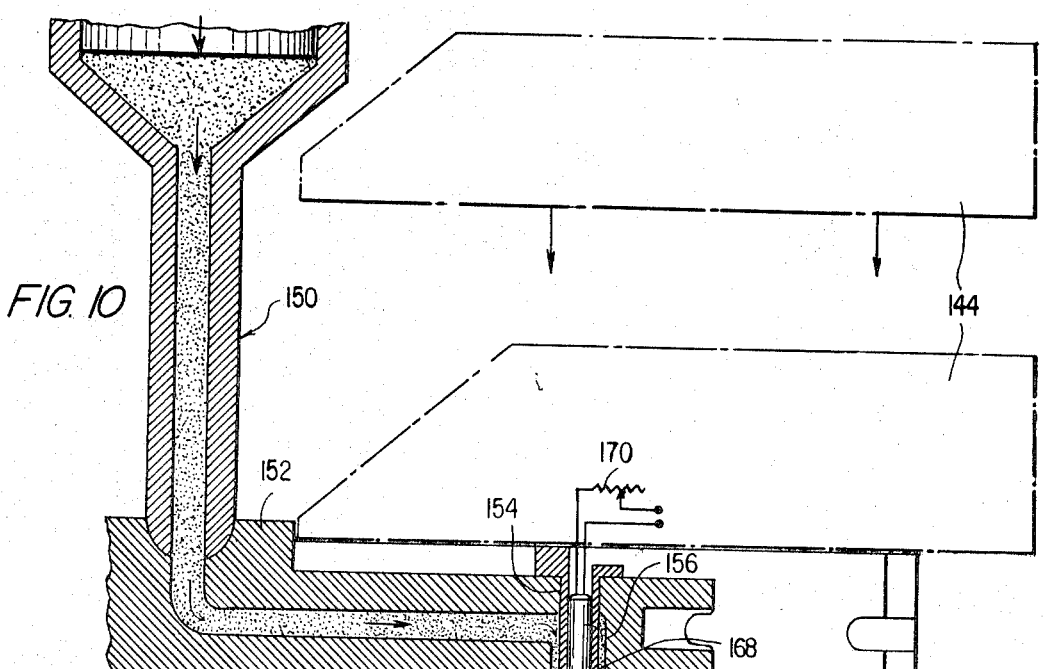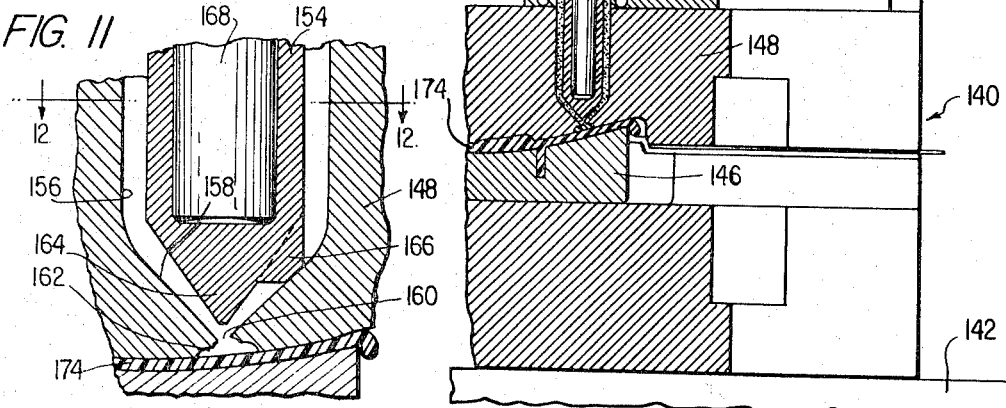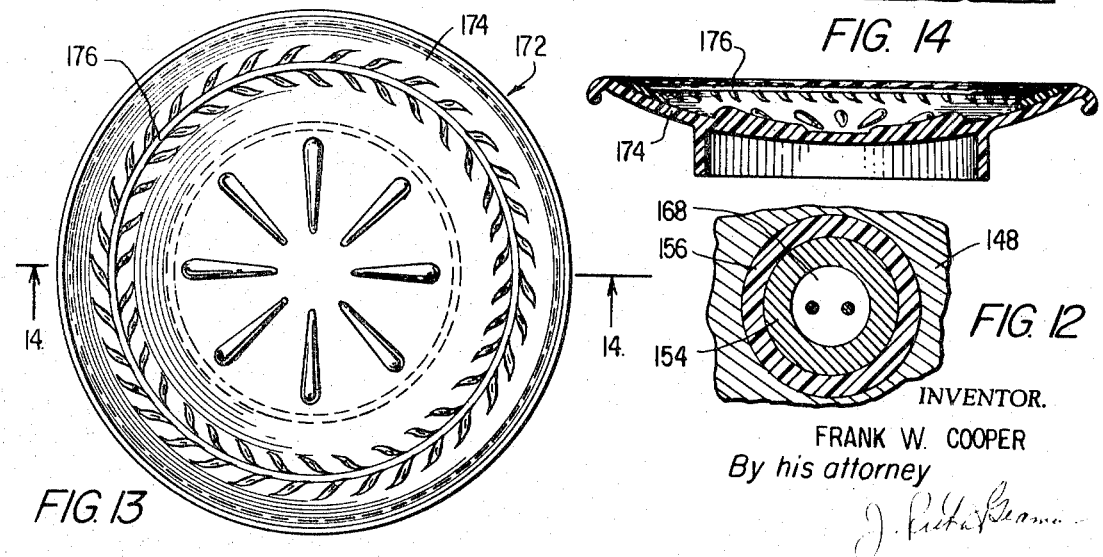

United States Patent Office 3,555,618
Patented Jan. 19, 1971

3,555,618
PLASTIC MOLDING APPARATUS
Frank W. Cooper, Mc Candless Township, Pa., assignor, by mesne assignments, to Cities Service Company, a corporation of Delaware
Original application Dec. 3, 1965, Ser. No. 511,386. Divided and this application Jan. 27, 1969, Ser. No. 810,895
Int. Cl. B29f 1/00
U.S. Cl. 18—30                               5 Claims

ABSTRACT OF THE DISCLOSURE

Apparatus for injection molding embossed plastic articles is disclosed herein. The apparatus is characterized by a mold assembly comprising a first mold for forming the base article and a second mold for molding the embossed design thereon, with both molds being mounted on a movable platen. Each mold comprises a core and a plurality of radially movable segments in the form of arcuate wedges with tapered surfaces and cooperating with sloping shoulders on the mold assembly so that by movement of the movable platen the segments can either be moved inwardly to form the mold cavities or outwardly to release the articles. A fixed platen having a molten plastic injection means is mounted in spaced relationship with and opposite the mold assembly. A fixedly mounted hydraulic cylinder acts to move the movable platen towards and away from the fixed platen.

---

This application is a division of abandoned application Ser. No. 511,386, filed Dec. 3, 1965.

This invention relates to plastic molding and, more particularly to an apparatus for molding plastic articles.

Raised characters or figures may be formed on plastic articles by molding the article in one piece. If the raised figures, however, are to have a color contrasting with that of the base, the article cannot be molded in one piece, unless the raised characters or figures are colored by a coating on the figures. When an article is formed of one piece of plastic, with the raised portions painted in a color contrasting with the base, the painting usually must be done by hand, which is slow and expensive. Furthermore, the paint may wear off.

A common method of forming plastic articles having raised figures of a contrasting color is to form a plastic base with openings in the base, and then force melted plastic to flow from the back of the base through the openings and into a mold cavity on the front side of the base. The plastic forming the figures is a different color from the plastic in the base. When the plastic forming the figures hardens, it is bonded to the base mechanically by the portions of the figure plastic that overlap on opposite sides of the base. An example of a patent describing this technique is Gits et al., No. 2,298,365.

This process for bonding the figures to the base may be satisfactory when the reverse side of the base is concealed, such as in name plates and typewriter keys. However, when both sides of a base are exposed, this process is unsatisfactory because the plastic which forms the figures is visible from the reverse side of the base.

Accordingly, it is an object of this invention to provide apparatus for separately molding raised figures on plastic articles.

It is a further object of this invention to provide apparatus for molding raised figures of contrasting color on one side only of a base.

It is another object of this invention to provide apparatus for economically molding plastic articles having raised figures of a different plastic composition on portions of the exterior surface of the article.

These objects are accomplished in accordance with a preferred embodiment of the invention by first forming a shell having an obverse and reverse side, then rigidly supporting the shell in a mold having a cavity that is completely filled by said shell. The mold also has a second cavity that is contiguous with the obverse side of the shell. Molten thermoplastic resin is injected into the second mold cavity at a sufficiently high rate and high pressure to cause partial fusion of the surface of the shell, so that upon cooling, a raised figure in the shape of the second mold cavity is formed on the shell and becomes an integral part of the shell.

Preferably, both the shell and the raised figure are molded in the same press. One mold forms the shell and the other mold forms the raised figure on the shell. Both molds are positioned between the press platen so that the molds are closed simultaneously and molten plastic is injected into the respective molds from separate extruders. When the press opens, the completed article is removed from the second mold and replaced by the shell that was formed in the first mold.

This preferred embodiment is illustrated in the accompanying drawings in which:

FIG. 10 is a cross sectional view, partially schematic, of a modified form of the press;

FIG. 11 is a detail cross sectional view of a portion of the nozzle shown in FIG. 10;

FIG. 12 is a cross sectional view of the nozzle along the line 12—12 in FIG. 11;

FIG. 13 is a top plan view of a dish having raised figures in accordance with this invention; and FIG. 14 is a cross sectional view of the dish along the line 14—14 in FIG. 13.

Figure 1:
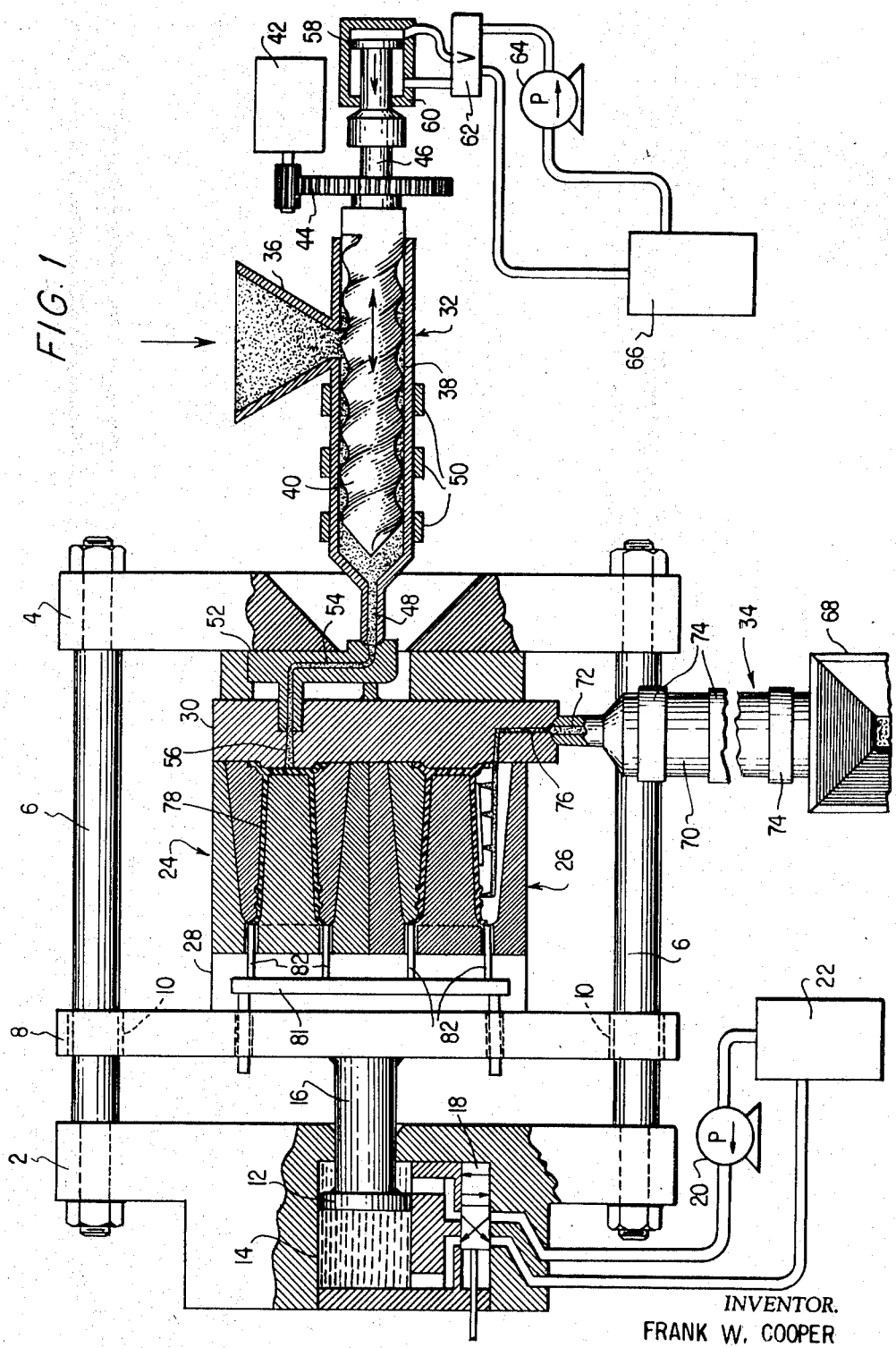
FIG. 1 is a side elevational view, partially in cross section, of a press for forming plastic articles in accordance with this invention.

A typical plastic molding press, as is shown schematically in FIG. 1, may be used for molding the articles of this invention. The press includes a frame 2 which is mounted horizontally on a suitable foundation. A fixed platen 4 is rigidly secured to the frame 2 by bars 6. A movable platen 8 has openings 10 through which the bars 6 extend, so that the movable platen is journaled on the bars 6 for longitudinal movement relative to the fixed platen 4. Movement of the platen 8 is accomplished by means of a piston 12 which reciprocates in a hydraulic cylinder 14 that is formed in the frame 2. A connecting rod 16 rigidly secures the movable platen 8 to the piston 12. The flow of hydraulic fluid to opposite sides of the piston 12 is controlled by a distributing valve 18. Hydraulic fluid is supplied to the valve 18 by a pump 20 which draws fluid from a reservoir 22. When the valve 18 is in the position shown in FIG. 1, hydraulic fluid under high pressure flows to the head end of the piston 12 and fluid from the rod end of the piston is directed back to the reservoir 22. In order to move the piston in the opposite direction, the valve 18 is shifted to cause the hydraulic fluid to flow to the rod end of the piston and to direct the flow of fluid back to the reservoir 22.

A pair of mold assemblies 24 and 26 are mounted on a base 28 which is secured to the movable platen 8. The mold assemblies 24 and 26 cooperate with a fixed mold platen 30 that is secured to the press platen 4.

Molten plastic is supplied to the mold assemblies 24 and 26 by plastic injection apparatus 32 and 34. The apparatus 32 is shown schematically in FIG. 1 and includes a hopper 36 for receiving granular thermoplastic molding material. The hopper 36 communicates with the interior of a tubular housing 38. A rotary worm 40 in the housing 38 is rotated by a motor 42 which drives the worm through suitable gearing 44 that is connected with the worm shaft 46. As the worm rotates, the granular material in the hopper 36 is drawn into the housing 38 and is conveyed toward and outlet passage 48. There are a plurality of heater bands 50 on the housing 38 to supplement the frictional heating of the plastic between the worm and the housing. When the plastic reaches the end of the worm 40, it is completely melted. The actual temperature of the plastic depends upon the type of plastic that is being molded, but the temperature may be as high as 750° F. A runner 52 is rigidly mounted between the mold platen 30 and the fixed platen 4. The runner 52 has a passage 54 for directing the molten plastic from the passage 48 into a passage 56 in the mold platen 30 which communicates with the mold cavity in the assembly 24.

The molten plastic is injected into the mold cavity at a very high pressure and at a high rate. Usually the mold cavity is filled with plastic within 2 seconds. The injection is accomplished by displacing the worm 40 rapidly toward the outlet passage 48. Axial movement of the worm is accomplished by means of a piston 58 which reciprocates in a hydraulic cylinder 60. Movement of the piston 58 is controlled by a valve 62 which directs the flow of fluid from the pump 64 either to the head end or the rod end of the piston 58 for moving the screw toward or away from, respectively, the outlet passage 48. Fluid from the low pressure side of the piston is returned to a reservoir 66.

The injection apparatus 34 may be of substantially the same construction as the other apparatus 32, including a hopper 68, a housing 70 having an outlet passage 72 and heater bands 74 on the outside of the housing 70. The remainder of the structure apparatus 34 is omitted to simplify the drawing, although the apparatus 34 has means for injecting the melted plastic at a rapid rate under high pressure into the mold cavity. A passage 76 is formed in the mold platen 30 communicating between the outlet passage 72 and the mold cavity in the mold assembly 26.

The apparatus of this invention preferably has at least two mold assemblies 24 and 26 in which the articles are formed. In the first assembly 24, a plastic shell 78 is molded in the mold cavity. The shell 78 is then transferred to the second assembly 26 where figures are molded on the surface of the shell. The mold cavity in the second assembly 26 is the same in size and shape as the shell 78 that was molded in the first assembly 24, but there is also a figure forming portion 80 of the cavity. The portion 80 is contiguous with the portion of the cavity containing the shell 78, so that when molten plastic is injected through the passage 76, it flows into the portion 80 and contacts the surface of the shell 78. The molten plastic flows at a rapid rate and at a high temperature to fill the portion 80 of the mold cavity and causes sufficient melting at the surface of the shell 78 to fuse together the shell and the plastic in the cavity portion 80 when it cools.

The resulting article appears to be formed of one piece, since there is no physical discontinuity at the junction between the plastic forming the figures and the plastic in the shell 78. Of course, when the plastic in the second injection apparatus 34 has a different color from that of the shell 78, there is a sharp color demarcation around the edges of the raised figures on the surface of the shell.

Figure 2:
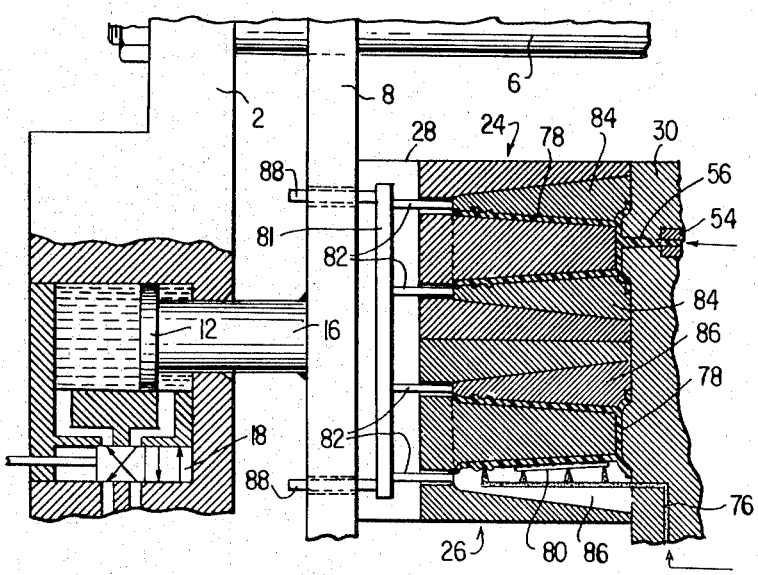
FIG. 2 is a cross sectional view of the mold and a portion of the press showing schematically the injection of the molten plastic for molding of the shell and the raised figures on the shell.

As shown schematically in FIG. 2, the mold cover and the mold base are continually urged toward each other during the injection operation by the piston 12 which is exposed at the head end to fluid at the pump pressure and sufficient force is applied to prevent separation of the cover and the base. After the injection of the plastic is completed, the valve 18 is shifted to place the rod end of the piston 12 in communication with fluid under pump pressure and the fluid at the head of the piston is returned to the reservoir 22. This causes movement of the piston 12 toward the left for separating the mold base 28 from the cover 26. As the mold assemblies 24 and 26 separate from the mold platen 30, the plastic forming the shell 78 breaks off at the end of the passage 54 and the melted plastic in the passage forms a clot which prevents leakage out of the end of the passage 54. Similarly, a clot is formed at the end of the passage 76.

The mold assemblies 24 and 26 are opened by an ejector mechanism which includes a bar 81 on which are mounted a plurality of ejector pins 82. The pins extend through the respective mold assemblies 24 and 26 and engage the lower end of mold segments 84 and 86. The bar 81 is mounted for axial movement in the platen 8 by means of pegs 88 which extend through openings in the platen 8 in position to engage the frame 2. When the platen 8 approaches the frame 2, the ends of the pegs 88 engage the frame, causing the bar 81 and the ejector pins 82 to remain stationary while the platen 8 moves toward the frame 2. Thus, the pins which engage the mold segments 84 and 86 displace the segments outwardly with respect to the remainder of the mold assemblies 24 and 26. The shells 78 can then be removed manually from the mold assemblies 24 and 26.

The mold segments 84 and 86 are in the form of arcuate wedges. Preferably, three segments are fitted together to form a tapered ring which, when inserted in the mold assembly 24, form a mold cavity in the shape of the shell 78. The outer surfaces of the segments 84 and 86 slope inwardly from the open end to the closed end of the respective assemblies 24 and 26. The corresponding surfaces in the assemblies 24 and 26 have substantially the same slope. When the segments are displaced outwardly by the pins 82, the segments are free to move radially, thereby releasing the shells 78. The segments 86 for forming the figures on the shell 78 are substantially the same shape as the segments 84, but there is an additional cavity in the interior surface of the segments 86 in the shape of the figure. One of the mold segments 86 is shown in FIG. 5.

Figure 6:
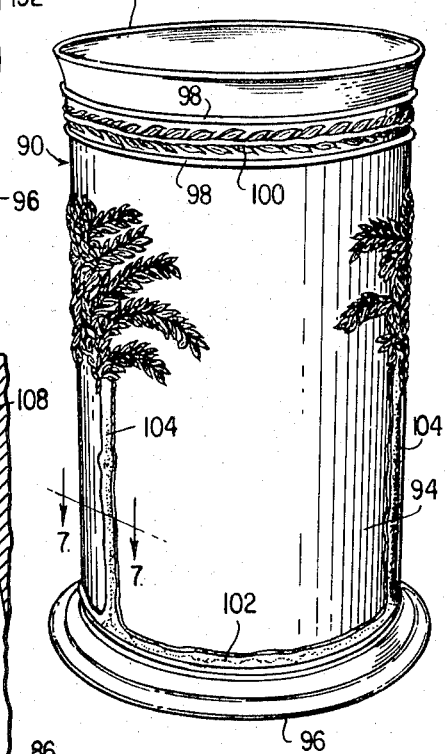
FIG. 6 is an example of an article having raised figures in accordance with this invention.

An article 90 molded in accordance with this invention is shown in FIG. 6. The article 90 is in the form of a hollow receptacle which has a lip 92 of a greater diameter than the side wall 94. A pedestal portion 96 is formed on the opposite end of the side wall 94. A pair of bands 98 project outwardly from the side wall 94 and a wreath figure 100 is formed on the side wall between the bands 98. There is also an irregular band 102 at the base of the side wall 94 with tree figures 104 extending up the side wall 94. The side wall 94, the pedestal 96 and the bands 98 are formed in the mold assembly 24, while the wreath figure 100, the band 102 and the tree figures 104 are molded on the side wall 94 in the mold assembly 26.

Figure 5:
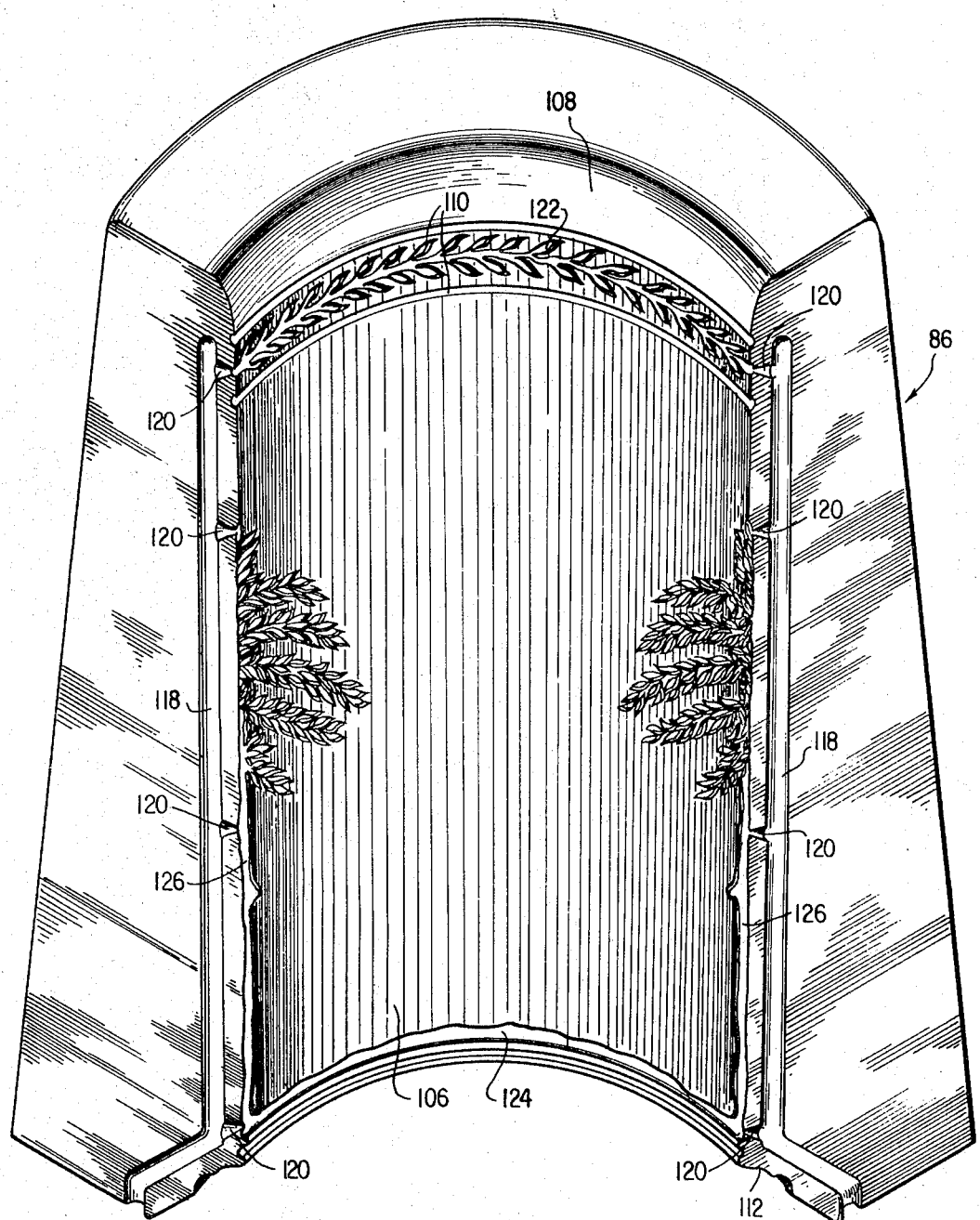
FIG. 5 is a perspective view of one of the mold segments for forming the raised figures.
Figure 8:
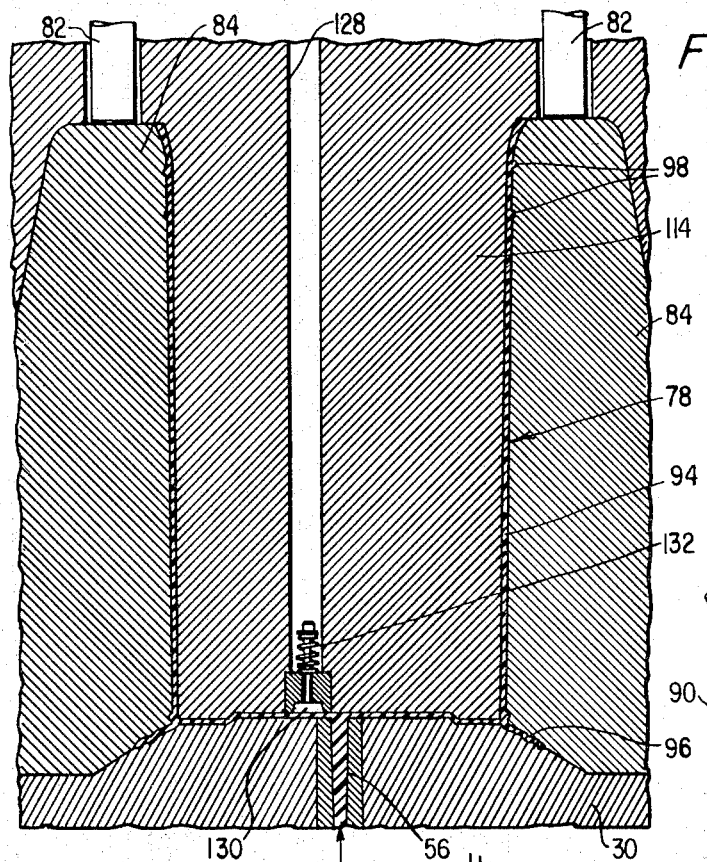
FIG. 8 is an enlarged cross sectional view of the mold for forming the shell.
Figure 9:
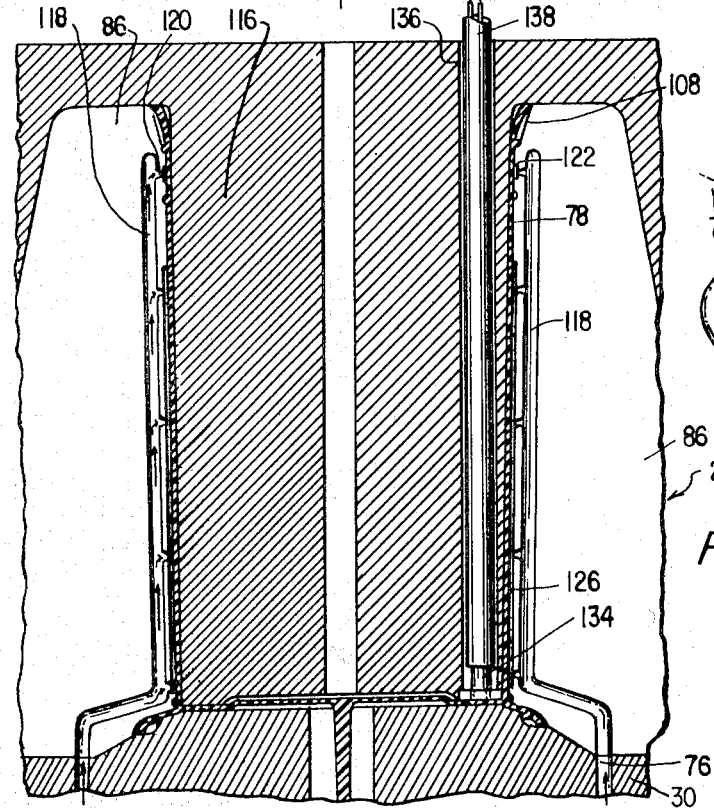
FIG. 9 is an enlarged cross sectional view of the mold for forming the raised figures on the shell.

Referring to FIGS. 5 and 9, each mold segment 86 has an inner surface 106 which fits tightly over the shell 78 and includes a chamfered portion 108 for receiving the lip portion 92 of the shell. Grooves 110 for receiving the bands 98 and a groove 112 for receiving the pedestal 96 are provided in the segment 86.

The mold assemblies 24 and 26 include core portions 114 and 116, respectively. The size and shape of the core portions 114 and 116 are substantially the same, so that the shell 78 will fit snugly on the core portion 116. When the mold assembly is closed by the platen 30, the mold segments 86 compress the shell 78 against the core portion 116 in the areas around the figures 100, 102 and 104. Grooves 118 are formed in each of the end faces of the mold segments 86 and there are a plurality of passages 120 communicating between the grooves 118 and the interior surface 106 of the mold segments 86. A recess 122 corresponding to the wreath figure 100 on the side wall 94 is formed in the surface 106. One of the passages 120 communicates between the bottom of the recess 122 and the grooves 118. Patterned recesses 124 and 126 are also formed in the surface 106 corresponding to the irregular band 102 and the tree figures 104, respectively. The adjacent segments 86 are substantially identical with the segment shown in FIG. 5 and there are grooves and passages in the abutting surfaces of the adjacent segments that correspond to the grooves 118 and passages 120.

Figure 7:
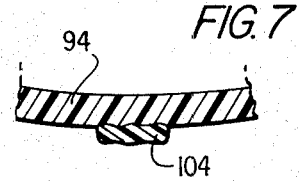
FIG. 7 is a cross sectional view of the article along the line 7—7 in FIG. 6.

When the mold is closed and molten plastic is injected through the passage 76 in the platen 30, it flows through the grooves 118 and through the passages 120 into the recesses 122, 124 and 126. The plastic is injected under very high pressure and at a rapid rate. The rapid flow of hot plastic from the second extruder 36 into the mold assembly 26 causes fusion and erosion to occur at the surface of the shell 78. When the plastic has cooled sufficiently to harden, there is an irregular line of demarcation between the figures on the side wall 94 in the area of the junction spaced from the surface of the figures. A typical cross sectional view of the figure 104 on the side wall 94 is shown in FIG. 7. If the shell 78 and the figures are formed of different colored plastics, there is a sharp and unwavering line marking the intersection of the surface of the side wall 94 and the figure. This sharp line occurs at the surface because there is only a slight melting of the shell surface at the edges of the figure, while at the portions of the junction spaced from the edges, there is a sufficient mass of hot plastic to cause considerable erosion and fusion.

After the shell 78 has been molded, it is necessary to remove the shell from the core portion 114. When the plastic material forming the shell 78 has a tendency to shrink upon cooling, the shell 78 may grip the core portion so tightly that it is difficult to remove. In order to release the shell from the core portion 114, a passageway 128 is formed in the core portion 114 and a poppet valve 130 is mounted at the end of the passage 128. The valve is biased toward a closed position by a spring 132. Preferably, the passage 128 and the valve 130 are offset from the passage 56 in the mold platen 30, so as not to interfere with the flow of plastic around the core portion 114. The valve 130 is opened after the shell 78 has been molded on the core portion 114. The valve is operated by directing air into the passage 128 at a sufficiently high pressure to overcome the force of the spring 132 and thereby opening the valve. The air is preferably directed into the passage 128 after the platen 30 has been partially displaced away from the core portion 114. When the valve 130 opens, the shell end wall is displaced outwardly away from the valve to allow air to enter the space between the core portion 114 and the end wall. The pressure differential acting on the end wall causes the shell to be displaced axially off of the core portion 114.

In order to prevent molten plastic from being injected into the mold assembly 26 when there is no shell in the mold cavity, a safety switch is provided in the core portion 116, as shown in FIG. 9. The safety switch includes a push rod 134 which is mounted in a bore 136. The push rod 134 is mounted for axial movement in an insulated housing 138 and is spring biased toward the mold platen 30. The push rod 134 is in position to be displaced into the housing 138 when a shell 78 is mounted on the core portion 116. When there is no shell between the end of the push rod and the platen 30, however, the push rod is displaced outwardly by the spring. Switch contacts inside the housing 138 are closed by the push rod when it is in the position shown in FIG. 9 and are open when the push rod is displaced outwardly. The switch contacts which are operated by the push rod 134 may be connected directly to the injection apparatus 34 to prevent its operation when a shell is not present in the mold assembly 26.

In operation, the injection apparatus 32 and 34 are operating to supply periodically a shot of molten plastic to their respective mold assemblies 24 and 26. The molding press is operated to close the mold assemblies by moving the valve 18 to the position shown in FIGS. 1 and 2. Initially, both of the mold cavities are empty. Of course, if a previously molded shell 78 is available it may be inserted in the mold assembly 26 before the cycle begins. When the mold assemblies 24 and 26 have moved into engagement with the platen 30, molten plastic is injected into the mold assemblies 24 and 26 by the apparatus 32 and 34. If a shell 78 has not been inserted in the mold assembly 26, the safety switch is open due to the position of the push rod 134 and the apparatus 34 does not inject plastic into the mold assembly 26.

Figure 3:
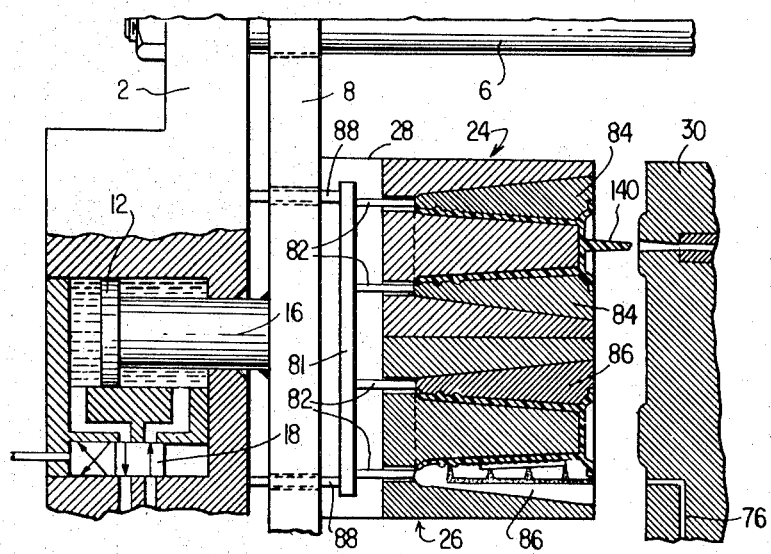
FIG. 3 is a cross sectional view of the mold and a portion of the press showing schematically the opening of the mold after injection of the plastic.
Figure 4:
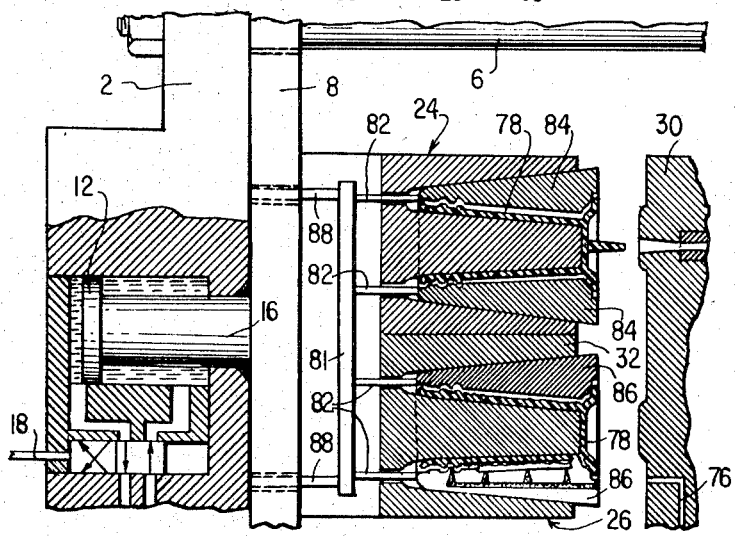
FIG. 4 is a cross sectional view of the mold and a portion of the press showing the ejection of the molded articles.

After the plastic has been injected into the mold assemblies 24 and 26, the valve 18 is moved to the position shown in FIG. 3, causing the mold assemblies 24 and 26 to be drawn away from the press platen 30. When the pegs 88 engage the frame 2, the bar 81 is displaced toward the assemblies 24 and 26, causing the pins 82 to displace the mold segments 84 and 86 outwardly to release the molded shells 78. The shell from the mold assembly 24 may have the sprue 140 trimmed off after the shell is removed from the mold assembly 24. The molded article 90 is removed from the mold assembly 26 and the runners of plastic which hardened in the grooves 118 and passages 120 between the segments 86 remain attached to the article and may be trimmed off. The molded shell 78 is then inserted in the mold assembly 26 and the cycle is repeated.

A modified form of the invention is illustrated in FIGS. 10 to 12. The mold apparatus is mounted between a stationary platen 142 and a movable platen 144. The apparatus includes a base plate 146 and a platen 148. Molten plastic for forming figures is supplied by an injection apparatus 150. The plastic flows through a passage in a runner 152 to a pin point gate that is provided in the platen 148. The gate includes a mandrel 154 which is received in an enlarged passage 156 in the runner 152 and in the platen 148. The mandrel 154 is rigidly secured to the runner 152 by any suitable means. The passage 156 has a sloping shoulder 158 and an orifice 160 that is positioned in a recess 162 in the platen 148, as shown in FIG. 11. The mandrel 154 has a tapered end 164 that is spaced from the shoulder 158 by a plurality of lugs 166 which are arranged around the circumference of the mandrel 154. The lugs 166 are relatively thin, so that they do not impede the flow of plastic through the passage 156. It is essential to maintain the plastic in a fluid state as it flows through the passage 156, and accordingly, a heating element 168 is mounted in the interior of the mandrel 154. The end of the mandrel 154 through which the heating element is inserted may remain open, so that the heating element may be replaced without removing the mandrel from the runner 152. The temperature of the heating element is adjusted by means of a rheostat 170.

An example of an article produced by this modified form of the apparatus is shown in FIGS. 13 and 14. The article 172 has a shell 174 formed of a thermoplastic material and a wreath figure 176 is applied to the shell 174. The figure 176 preferably is formed of a plastic having a different color from that of the base. As shown in FIG. 14, the fusion and erosion occurs at the surface of the shell when the molten plastic is injected through the orifice 160. The use of the pin point gate of this invention permits figures to be applied at locations remote from the edges of the article, without overlapping the opposite side of the article.

In operation, a previously molded shell 174 is placed in the mold base 146 and the mold is closed by moving the platen 148 to the position shown in FIG. 10. The injector apparatus 150 is then actuated to convey molten plastic under high pressure through the passage in the runner 152 into the passage 156. The molten plastic flows through the orifice 160 and into the recess 162. Preferably, there are a plurality of gates spaced around the circumference of the shell 174 for forming the figure 176. As the plastic flows through the recess 162, it causes fusion and erosion of the plastic in the shell 174 and when the plastic cools and hardens the figure 176 is an integral part of the shell 174. After the plastic has been injected, the pressure imposed on the plastic by the apparatus 150 is relieved and the mold is opened. Due to exposure of the plastic at the orifice 160 to cooler temperatures, a clot forms and prevents the melted plastic in the passage 156 from leaking out through the orifice 160. The heater 168 maintains the plastic in the passage 160 in a molten state, so that it is ready for the next shot.

One advantage of the method and apparatus of this invention is that an article may be formed of plastic having figures of a different color on the outer surface of the article, without disfiguring the opposite side or the interior surface of the article. Since there is substantially complete fusion bonding between the shell and the figures formed on the shell, the figures are permanently made a part of the shell and there is no danger of the figures being dislodged due to handling of the article. Furthermore, the articles may be rapidly produced using conventional molding press equipment in which are mounted the particular mold assemblies of this invention.

While this invention has been illustrated and described in several embodiments, it is recognized that variations and changes may be made therein without departing from the invention as set forth in the claims.

I claim:

1. Apparatus for molding plastic articles comprising a mold assembly, and a mold platen, said assembly including a plurality of mold segments and a core projecting towards said platen, means for urging said segments toward said core upon displacement of said assembly towards said platen, said segments being arcuate and having a mold cavity therein, at least one of said mold segments having a face abutting an adjacent mold segment, said face extending from end to end of said segment and having a groove therein, and means for injecting molten plastic into said mold cavity, said groove communicating between said injecting means and said mold cavity, whereby the separation of the mold segments releases the molded article and the plastic in the groove.

2. An apparatus according to claim 1 wherein each of said mold segments has an outer surface tapered from end to end, and said means for urging said segments towards said core includes a sloping surface cooperating with said segments' outer surface, whereby the segments are displaced toward said core upon displacement of said platen toward said core.

3. An apparatus according to claim 1 including a plurality of pins extending through said mold assembly, said pins being in position to engage said segments, and means for longitudinally displacing said pins upon separation of said platen and mold assembly, whereby said pins move the mold segments away from said core.

4. An apparatus according to claim 1 wherein said core includes a longitudinal passage therethrough, a valve in said passage, and means for opening said valve when said platen and mold assembly are separated, whereby a molded article may be released from said core.

5. An apparatus for molding plastic articles comprising a mold assembly, a mold platen, said assembly including a plurality of mold segments and a core projecting towards said platen, said core including a push rod having one end projecting beyond the distal end of said core, a switch means in position to be actuated upon displacement of said push rod into said core, means for urging said segments toward said core upon displacement of said assembly towards said platen, said segments being arcuate and having a mold cavity therein, means for injecting molten plastic into said mold cavity, and means for rendering said injecting means inoperative in response to said switch means, whereby the switch means prevents accidental injection of molten plastic when a previously molded shell has not been placed over said core.

References Cited

UNITED STATES PATENTS

| | | | |
|---|---|---|---|
| 2,226,408 | 12/1940 | Nast | 18—30 |
| 2,333,059 | 10/1943 | Tucker | 18—30 |
| 3,078,515 | 2/1963 | Wintriss | 18—30X |
| 3,339,242 | 9/1967 | Lamb | 18—45X |
| 3,046,013 | 7/1962 | Kutik | 18—42DUX |
| 3,301,928 | 1/1967 | Plymale | 18—42X |
| 3,473,197 | 10/1969 | Wilds et al. | 18—42 |

H. A. KILBY, JR., Primary Examiner